(12) United States Patent
Ide et al.

(10) Patent No.: US 9,426,323 B2
(45) Date of Patent: Aug. 23, 2016

(54) DEVICE WITH SHIELD TO REDUCE DEGRADATION OF CALCULATION OF MEDIUM TRANSPORT

(71) Applicant: Seiko Epson Corporation, Tokyo (JP)

(72) Inventors: Mitsutaka Ide, Shiojiri (JP); Hideyuki Kataoka, Shiojiri (JP); Hiroyuki Kobayashi, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/795,644

(22) Filed: Jul. 9, 2015

(65) Prior Publication Data

US 2016/0028914 A1 Jan. 28, 2016

(30) Foreign Application Priority Data

Jul. 22, 2014 (JP) .................. 2014-149057

(51) Int. Cl.
*G06F 15/00* (2006.01)
*G06K 15/00* (2006.01)
*G06K 1/00* (2006.01)
*H04N 1/00* (2006.01)

(52) U.S. Cl.
CPC ......... *H04N 1/00994* (2013.01); *H04N 1/0032* (2013.01); *H04N 1/0083* (2013.01); *H04N 1/00278* (2013.01); *H04N 1/00702* (2013.01); *H04N 1/00724* (2013.01); *H04N 1/00734* (2013.01); *H04N 1/00779* (2013.01); *H04N 1/00981* (2013.01)

(58) Field of Classification Search
USPC .................................. 358/1.1–1.18
See application file for complete search history.

(56) References Cited

U.S. PATENT DOCUMENTS

| | | | |
|---|---|---|---|
| 8,373,893 B2 * | 2/2013 | Inoue et al. ..................... 358/1.7 |
| 8,836,828 B2 * | 9/2014 | Kurane et al. ................. 348/294 |
| 2002/0127038 A1 * | 9/2002 | Omura ................ G03G 15/234 399/401 |
| 2013/0141487 A1 | 6/2013 | Abe | |

FOREIGN PATENT DOCUMENTS

JP 2013-119439 A 6/2013

* cited by examiner

*Primary Examiner* — Douglas Tran

(57) ABSTRACT

An imaging device includes an imaging unit that includes an imaging element for imaging a lower surface of continuous forms paper, an image processing unit that image-processes an image of the lower surface of the continuous forms paper captured by the imaging unit, a cable that electrically connects the imaging unit and the image processing unit with each other, and an electric box that covers the imaging element, the image processing unit, and the cable and functions as an electromagnetic shield.

4 Claims, 5 Drawing Sheets

DEVICE WITH SHIELD TO REDUCE DEGRADATION OF CALCULATION OF MEDIUM TRANSPORT

BACKGROUND

1. Technical Field

The present invention relates to an imaging device for imaging a medium, and a medium transporting apparatus and a printing apparatus which includes the imaging device.

2. Related Art

As a printing apparatus which performs printing on a medium such as a sheet, a printing apparatus that is provided with an imaging device for imaging a lower surface of the medium transported by a transporting unit and a control device for calculating a transportation amount of the medium based on paper-surface properties of the lower surface of the medium imaged by the imaging device, and in which the control device controls the transporting unit based on the transportation amount of the medium is known (for example, refer to JP-A-2013-119439).

As this printing apparatus, for example, JP-A-2013-119439 discloses a printing apparatus which performs a template matching process for detecting a position where the similarity is maximized by moving a rectangular template set in advance in the image of the medium which is captured previously onto the image of the medium which is captured this time so as to calculate the transportation amount of the medium. That is, JP-A-2013-119439 discloses the printing apparatus which calculates the distance, in the transporting direction, between a position of the template in the image captured previously and a matched position of the template in the image captured this time as the transportation amount of the medium.

In addition, the printing apparatus disclosed in JP-A-2013-119439, as illustrated in FIG. 3 disclosed in JP-A-2013-119439, an imaging unit (an imaging device) is provided in a support base which supports the medium, and a control device is provided outside the support base and at a position separated from the support base.

Incidentally, the printing apparatus disclosed in JP-A-2013-119439 is required to include an electrical transmission line such as a cable for electrically connecting the imaging device and the control device. The electrical transmission line is wired outside the support base and the control device, and thus noise such as electromagnetic waves generated from other devices in the printing apparatus is likely to enter therein. For this reason, when the image having the paper-surface properties of the medium which is captured by the imaging device is transmitted to the control device through the electrical transmission line, the noise may enter the image in some cases. In this case, in the printing apparatus disclosed in JP-A-2013-119439, there is a concern in that when the printing apparatus performs the template matching process, a position of the template which is different from the position of the template to be matched in the image captured this time is erroneously set to the position where the similarity is maximized, and then the transportation amount of the medium is calculated based on the erroneous position of the template. For this reason, calculation accuracy of the transportation amount of the medium may be degraded. Such a problem is not limited to the printing apparatus, and may also occur in a medium transporting apparatus for transporting the medium.

SUMMARY

An advantage of some aspects of the invention is to provide an imaging device, a medium transporting apparatus, and a printing apparatus which can reduce degradation of calculation accuracy of a transportation amount of a medium.

Hereinafter, means of the invention and operation effects thereof will be described.

According to an aspect of the invention, there is provided an imaging device including an imaging unit that includes an imaging element for imaging a medium; an image processing unit that image-processes an image of the medium captured by the imaging unit; an electrical transmission line that electrically connects the imaging unit and the image processing unit with each other; and an electromagnetic shield that covers the imaging element, the image processing unit, and the electrical transmission line.

According to the above configuration, since noise is prevented from entering the imaging element, the image processing unit, and the electrical transmission line by the electromagnetic shield, the noise is prevented from entering the image of the medium which is captured by the imaging unit. For this reason, it is possible to reduce degradation of calculation accuracy of a transportation amount of the medium.

In addition, in the imaging device, it is preferable that, in the electromagnetic shield, the imaging unit and the image processing unit are disposed to be separated from each other, and a thermal insulation member which partitions the imaging element and the image processing unit is disposed between the imaging unit and the image processing unit.

According to the above configuration, the heat generated from the image processing unit is less likely to be transferred to the imaging unit due to the thermal insulation member. Accordingly, it is possible to suppress an increase in the temperature of the imaging unit caused by the heat generated from the image processing unit.

In addition, in the imaging device, it is preferable that a cooling fan that cools image processing unit is included.

According to the above configuration, since the temperature of the image processing unit is less likely to be increased by the cooling fan, the heat generated from the image processing unit is less likely to be transferred to the thermal insulation member. Therefore, the increase in the temperature of the imaging unit is further suppressed.

According to another aspect of the invention, there is provided a medium transporting apparatus including a transporting unit that transports a medium; and an imaging device that images the medium transported by the transporting unit, in which the imaging device includes an imaging unit that includes an imaging element for imaging a medium, an image processing unit that image-processes an image of the medium captured by the imaging unit, an electrical transmission line that electrically connects the imaging unit and the image processing unit with each other, and an electromagnetic shield that covers the imaging element, the image processing unit, and the electrical transmission line.

According to the above configuration, since the noise is prevented from entering the imaging element, the image processing unit, and the electrical transmission line by the electromagnetic shield, the noise is prevented from entering the image of the medium which is captured by the imaging unit. For this reason, it is possible to reduce degradation of calculation accuracy of a transportation amount of the medium.

According to still another aspect of the invention, there is provided a printing apparatus including a transporting unit that transports a medium; a printing unit that performs printing on the medium transported by the transporting unit; and an imaging device that images the medium transported by the transporting unit, in which the imaging device includes an imaging unit that includes an imaging element for imaging a medium, an image processing unit that image-processes an image of the medium captured by the imaging unit, an electrical transmission line that electrically connects the imaging unit and the image processing unit with each other, and an electromagnetic shield that covers the imaging element, the image processing unit, and the electrical transmission line.

According to the above configuration, since the noise is prevented from entering the imaging element, the image processing unit, and the electrical transmission line by the electromagnetic shield, the noise is prevented from entering the image of the medium which is captured by the imaging unit. For this reason, it is possible to reduce degradation of calculation accuracy of a transportation amount of the medium.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of a printing apparatus will be described with reference to the drawings. The printing apparatus of the embodiment is, for example, formed of an ink jet type printer which performs printing by ejecting ink, which is an example of a liquid, on a medium. In addition, the aforementioned printer is a so called serial type printer which performs printing by using a printing method for moving a printing head in a direction intersecting with a transportation direction of the medium.

Figure 1:
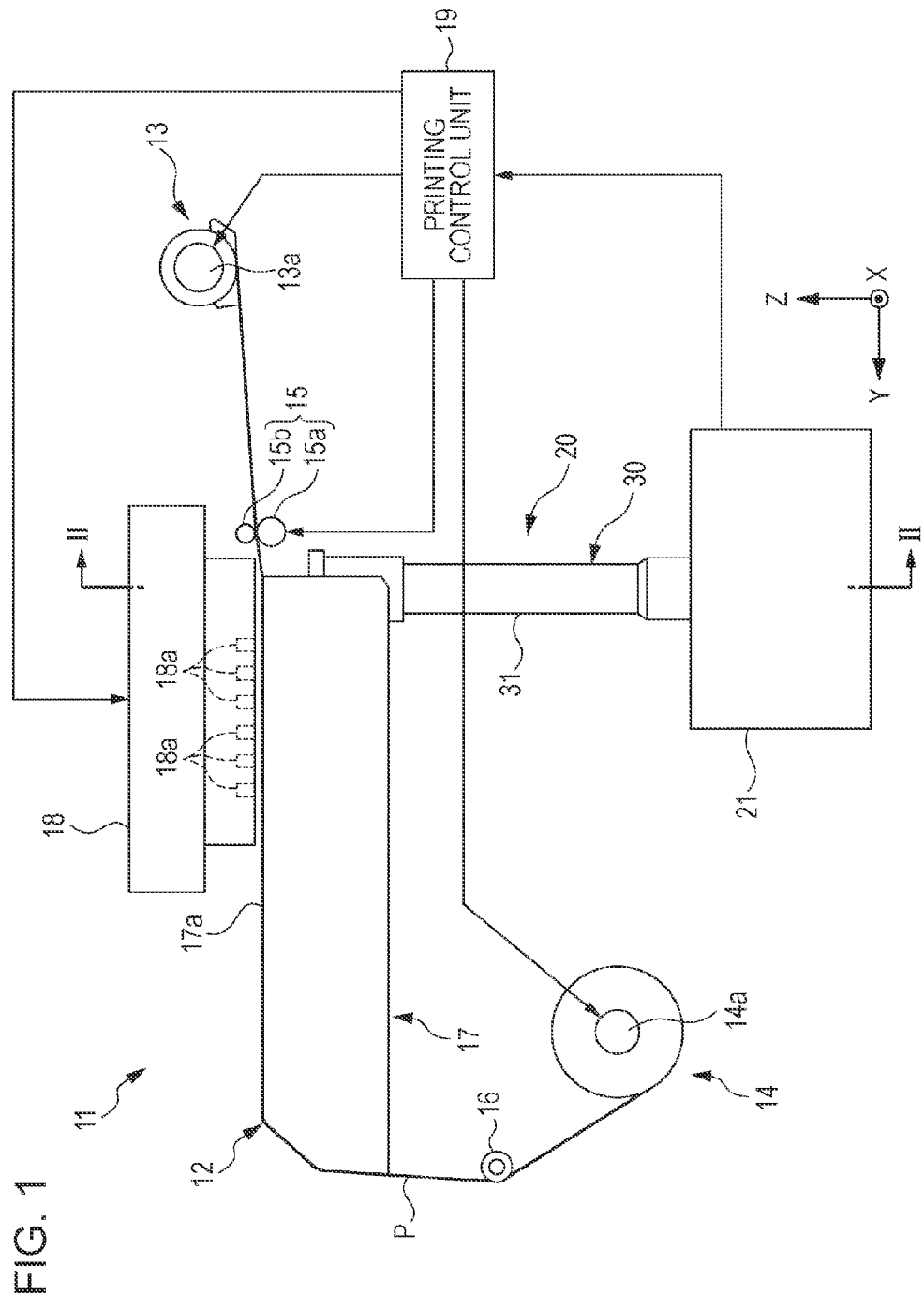
FIG. 1 is a schematic configuration diagram of a printing apparatus of the present embodiment.

As illustrated in FIG. 1, a printing apparatus 11 is provided with a transporting device 12 which transports continuous forms paper P which is an example of a medium formed into a long sheet shape, a printing unit 18 which performs printing by ejecting ink with respect to the continuous forms paper P transported by the transporting device 12, and a printing control unit 19 which controls the transporting device 12 and the printing unit 18.

In addition, in the printing apparatus 11, a support member 17 which supports the continuous forms paper P is disposed at a position facing the printing unit 18 with a transport path of the continuous forms paper P interposed therebetween. A surface of the support member 17 which faces the printing unit 18 is a support surface 17a which horizontally supports the continuous forms paper P transported by the transporting device 12.

The transporting device 12 is provided with a feeding unit 13 for feeding the continuous forms paper P, and a winding unit 14 for winding the continuous forms paper P which is fed from the feeding unit 13 and on which the printing is performed by the printing unit 18. In FIG. 1, the feeding unit 13 is disposed at a position on the right side which is an upstream side of the continuous forms paper P in a transportation direction Y (a left direction in FIG. 1), and the winding unit 14 is disposed at a position on the left side which is a downstream side thereof. In addition, in the transporting device 12, a pair of paper feed rollers 15 are disposed at a position between the feeding unit 13 and the support member 17 in the transport path, and a tension roller 16 is disposed at a position between the support member 17 and the winding unit 14 in the transport path. Further, in the embodiment, the feeding unit 13, the winding unit 14, the pair of paper feed rollers 15, and the tension roller 16 constitutes a transporting unit.

In the feeding unit 13, a feeding axis 13a extending in a width direction X of the continuous forms paper P (a direction orthogonal to a surface of the sheet in FIG. 1), which is the direction orthogonal to the transportation direction Y of the continuous forms paper P, is provided so as to be rotatably driven. The continuous forms paper P is supported by the feeding axis 13a so as to be rotatably integrated with the feeding axis 13a in a state of being wound in a roll shape in advance. Then, with the feeding axis 13a being rotary-driven, the continuous forms paper P is fed to the pair of paper feed rollers 15 from the feeding axis 13a.

The pair of paper feed rollers 15 include a paper feed roller 15a which is provided so as to be rotatably driven and a paper press roller 15b which is driven in accordance with the rotation of the paper feed roller 15a. The pair of paper feed rollers 15 guides the continuous forms paper P transported from the feeding unit 13 to the support surface 17a by interposing the continuous forms paper P between the paper feed roller 15a and the paper press roller 15b. In addition, the tension roller 16 adjusts the tension of an area in which the printing on the continuous forms paper P is finished.

In the winding unit 14, a winding axis 14a extending in the width direction X of the continuous forms paper P is provided so as to be rotatably driven. Then, with the winding axis 14a being rotary-driven, the printed continuous forms paper P which is transported from the tension roller 16 and is sequentially wound by the winding axis 14a.

The printing unit 18 is disposed so as to face a portion on the upstream side of the support surface 17a in the transportation direction Y. On a surface of the printing unit 18 which faces the support surface 17a, a plurality of nozzles 18a is formed so as to eject the ink onto the continuous forms paper P.

An imaging device 20 for detecting a transportation amount of the continuous forms paper P without contact is attached to the lower portion on the upstream side of the support member 17 in the transportation direction Y. The imaging device 20 images a texture (paper-surface properties) of a lower surface which corresponds to a non-printed surface of the continuous forms paper P, and then transmits the image to an imaging control unit 21 which is disposed in the lower portion of the imaging device 20. The imaging control unit 21, based on the image from the imaging device 20, calculates the transportation amount of the continuous forms paper P through the template matching process, and outputs the calculation result to the printing control unit 19. The printing control unit 19 controls the transportation of the continuous forms paper P which is performed by the transporting device 12 with a known method, based on the transportation amount of the continuous forms paper P.

Next, a specific configuration of the imaging device 20 will be described with reference to FIG. 2 and FIG. 3.

Figure 2:
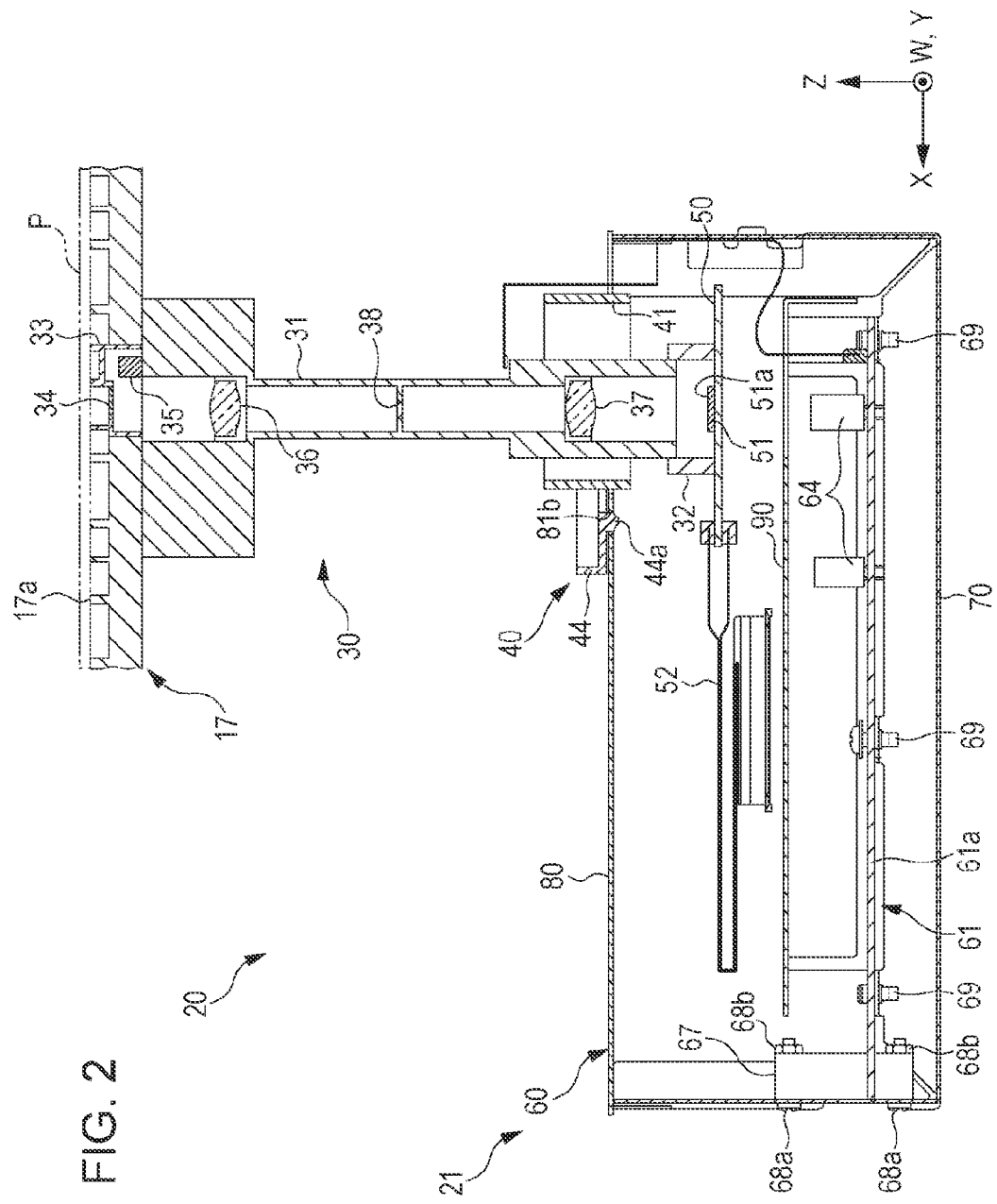
FIG. 2 is a sectional view taken along arrow line II-II in FIG. 1.

As illustrated in FIG. 2, the imaging device 20 is provided with an imaging unit 30 for imaging the lower surface of the continuous forms paper P, and an imaging control unit 21 for calculating the transportation amount of the continuous forms paper P based on the image captured by the imaging unit 30. The imaging control unit 21 is fixed to a lower end portion of the imaging unit 30.

The imaging unit 30 is provided with a first lens tube 31 which is formed into a cylindrical shape extending in a vertical direction Z, a second lens tube 32 which is fixed to the lower end portion of the first lens tube 31 by using an adhesive, and an attaching member 40 which is attached to a position on the upper side further than the second lens tube 32 with respect to the first lens tube 31. The attaching member 40 is movably attached to the first lens tube 31 and the second lens tube 32 in the vertical direction Z.

An upper end portion of the first lens tube 31 is fixed to the support member 17 by using a screw (not shown). A lens tube cover 33 is attached to the upper end portion of the first lens tube 31 in such a manner that the first lens tube 31 is blocked from the upper side. In the lens tube cover 33, a translucent member 34 which is colorless and transparent is fixed so as to allow transmission of light while suppressing the intrusion of paper dust, dirt, or the like.

A light irradiation unit 35 which irradiates the lower surface of the continuous forms paper P with light is disposed in a space which is formed by the upper end portion of the first lens tube 31 and the lens tube cover 33. The light irradiation unit 35 is a light source such as a light-emitting diode and a halogen lamp, and is formed of the light-emitting diode in the embodiment. The light irradiation unit 35 irradiates the continuous forms paper P with light over the lower surface of the continuous forms paper P which is transported from the support surface 17a to the translucent member 34. In this case, the light irradiation unit 35 is disposed in such a manner that the lower surface of the continuous forms paper P is obliquely irradiated with the light from the upper stream side in the transportation direction Y.

An object side lens 36 is accommodated in the upper portion of the first lens tube 31, and an image side lens 37 is accommodated in the lower portion of the first lens tube 31. A diaphragm 38 is formed in a portion between the object side lens 36 and the image side lens 37 in the first lens tube 31. The object side lens 36 and the image side lens 37 can be embodied as telecentric lenses.

The lower end portion of the first lens tube 31 is accommodated in the second lens tube 32. The adhesive is interposed between an outer peripheral surface of the lower end portion of the first lens tube 31 and an inner peripheral surface of the second lens tube 32.

A circuit board 50 is fixed to the lower end portion of the second lens tube 32 by using the screw (not shown). An imaging element 51 for imaging the lower surface of the continuous forms paper P is mounted on the upper surface of the circuit board 50. The imaging element 51 is disposed in an inner portion of the second lens tube 32. The imaging element 51 is, for example, formed of a two-dimensional image sensor. In addition, a cable 52, which is an example of the electrical transmission line electrically connecting the circuit board 50 and the imaging control unit 21 with each other, is attached to a part of the outside of the second lens tube 32 in the circuit board 50. The cable 52 is, for example, formed of a flexible flat cable (FFC).

The imaging unit 30 images the following lower surface of the continuous forms paper P. That is, the light emitted from the light irradiation unit 35 is transmitted through the translucent member 34, is reflected on the lower surface of the continuous forms paper P, and then transmits through the translucent member 34 again, and then is condensed by the object side lens 36. The light which transmits through the object side lens 36 transmits through the diaphragm 38 so as to narrow the range of the light, and then is condensed by the image side lens 37. The light which transmits through the image side lens 37 is image-formed on an imaging surface 51a of the imaging element 51. With this, the imaging element 51 captures an image of the lower surface of the continuous forms paper P. In addition, in order to calculate the transportation amount of the continuous forms paper P, the image of the lower surface of the continuous forms paper P is output to the imaging control unit 21 via the cable 52.

Figure 3:
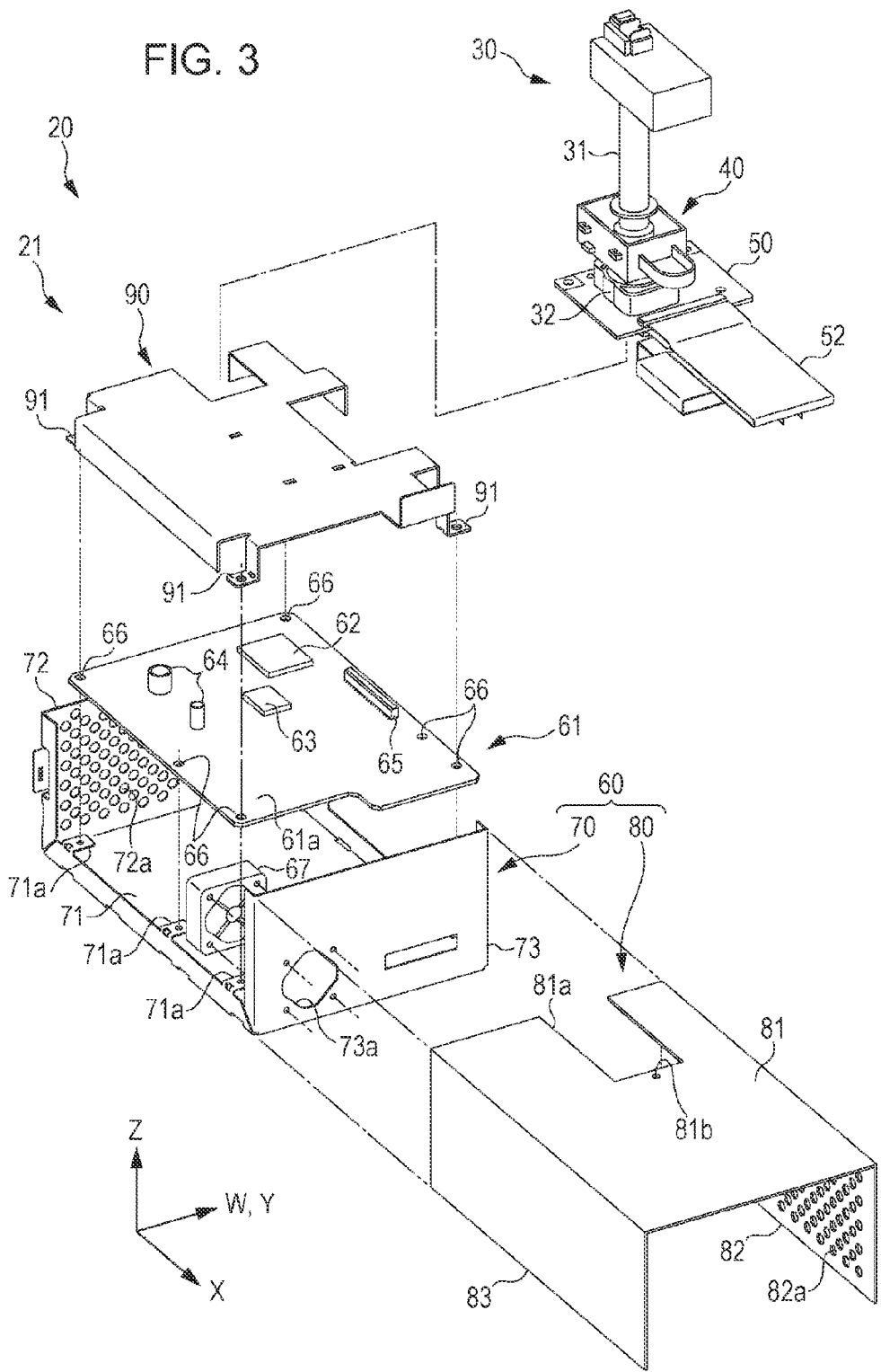
FIG. 3 is an exploded perspective view of the imaging device of the embodiment.

As illustrated in FIG. 3, the imaging control unit 21 is provided with an electric box 60 which is formed of a first housing 70 and a second housing 80, a control board 61 which is disposed on a lower area inside the electric box 60, a thermal insulation member 90 which is disposed in a gap on the upper side of the control board 61, and a cooling fan 67 which is disposed at an end portion of the electric box 60 of the continuous forms paper P in the width direction X.

The electric box 60 is formed into a box shape by being fixed with the screw (not shown) in a state in which the first housing 70 and the second housing 80 are combined with each other. The electric box 60 accommodates the control board 61, the circuit board 50, the imaging element 51 (refer to FIG. 2), and the cable 52 therein. The electric box 60 serves as the electromagnetic shield which suppresses the intrusion of the noise from outside the control board 61, the circuit board 50, the imaging element 51, and the cable 52.

The first housing 70 and the second housing 80 are formed of steel sheets. The first housing 70 is provided with a bottom plate 71 forming the lower surface of the electric box 60, and a first side plate 72 and a second side plate 73 which form the side surface of the electric box 60 in the width direction X. On each side of the bottom plate 71 in the direction (hereinafter, referred to as an "orthogonal direction W") orthogonal to the vertical direction Z and the width direction X, three fixing portions 71a are formed (only the fixing portions 71a on one side in the orthogonal direction W are illustrated in FIG. 3). The three fixing portions 71a are formed in the width direction X at intervals. A plurality of via holes 72a is formed on the first side plate 72. An opening portion 73a is formed on the second side plate 73.

The second housing 80 is provided with a top plate 81 which forms the upper surface of the electric box 60, and a first side plate 82 and a second side plate 83 which form the side surface of the electric box 60 in the orthogonal direction W. A notch portion 81a which is formed into a rectangular shape is formed on the top plate 81 in such a manner that the attaching member 40 is fitted thereinto, and a fitting hole 81b is formed in the vicinity of an edge along the orthogonal direction W in the notch portion 81a. In addition, the plurality of via holes 82a is formed on the first side plate 82.

The control board 61 is disposed on the lower side of the gap with respect to the circuit board 50. The control board 61 is provided with a circuit component which processes the image of the lower surface of the continuous forms paper P which is captured by the imaging unit 30, and calculates the transportation amount of the continuous forms paper P based on the processed image. As an example of the circuit component, an image processing unit 62 which performs image-processing on the image of the lower surface of the continuous forms paper P captured by the imaging element 51, and a transportation amount calculating unit 63 which calculates a transportation amount of the continuous forms paper P based on the lower surface of the continuous forms paper P which is the image processed by the image processing unit 62 are mounted on the upper surface of a board body 61a of the control board 61. As described above, in the electric box 60, the image processing unit 62 and the transportation amount calculating unit 63, and the imaging element 51 are disposed separated from each other (refer to FIG. 2). The image processing unit 62 and the transportation amount calculating unit 63 are formed of a micro-computer. In addition, an electronic component 64 which performs removal of the noise and a connector 65 to which the cable 52 is connected are mounted on the upper surface of the board body 61a. Meanwhile, the electronic component 64 is, for example, formed of a capacitor.

Six fixing portions 66 are formed on the board body 61a. Three fixing portions 66 are formed on each of both ends of the board body 61a in the orthogonal direction W. The three fixing portions 66 are formed in the width direction X at intervals. Each of the fixing portions 66 is overlapped with the upper side of each fixing portion 71a of the bottom plate 71.

The thermal insulation member 90 is formed of the steel sheet. The thermal insulation member 90 is disposed between the control board 61 and the imaging unit 30, and partitions the control board 61 and the imaging unit 30. The fixing portion 91 is formed in each of the four corners of the thermal insulation member 90 (only three fixing portions 91 are illustrated in FIG. 3). Each of the fixing portions 91 is overlapped with the upper side of the fixing portion 66 of the control board 61. The first housing 70, the control board 61, and the thermal insulation member 90 are fixed by a screw 69 (refer to FIG. 2) in a state where each of the fixing portions 71a, 66, and 91 are overlapped with each other in the vertical direction Z.

As illustrated in FIG. 2, the cooling fan 67 is, for example, an axial fan, and is fixed to the second side plate 73 by using a bolt 68a and a nut 68b. The cooling fan 67 discharges the air from the inside of the electric box 60 to the outside of the electric box 60 via the opening portion 73a. The cooling fan 67 is disposed in such a manner that the central axis (a dashed line) thereof is disposed on the lower side of the thermal insulation member 90.

The configuration of the attaching member 40, and the fixing structure of the imaging unit 30 and the electric box 60 will be described with reference to FIGS. 2, 4, and 5.

Figure 4:
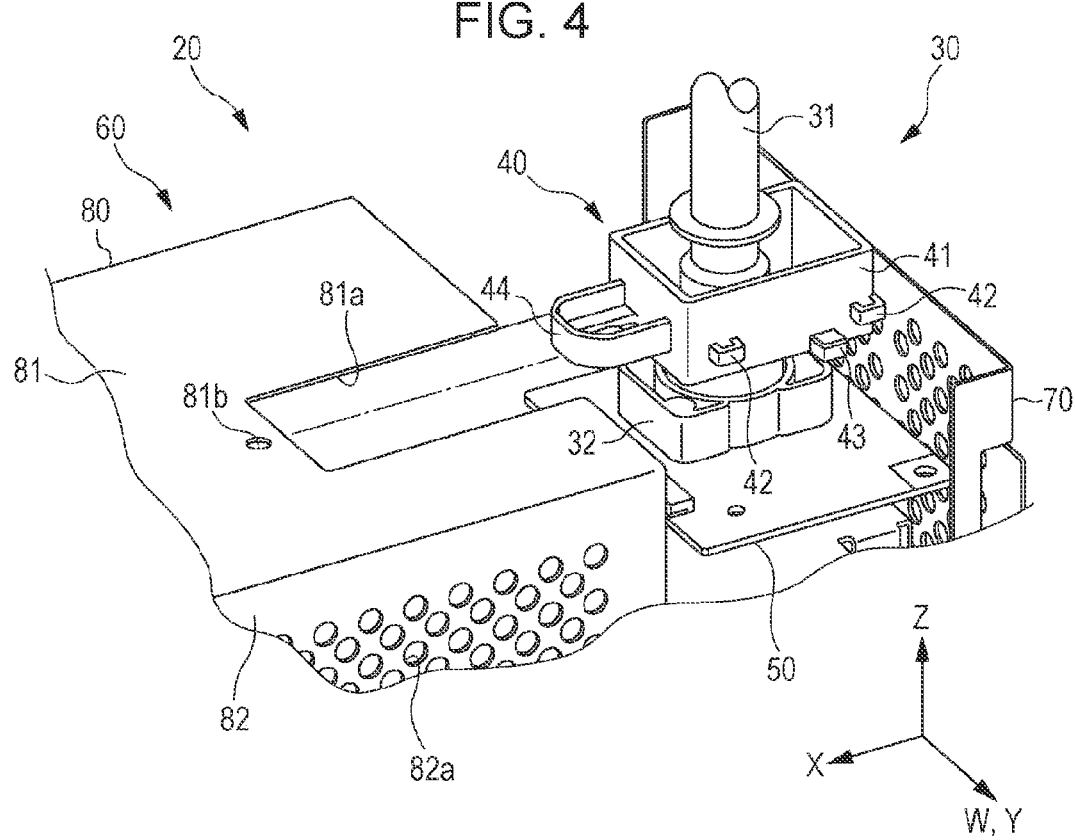
FIG. 4 is a perspective view illustrating a state before an imaging unit and an electric box of the imaging device of the embodiment are combined with each other.
Figure 5:
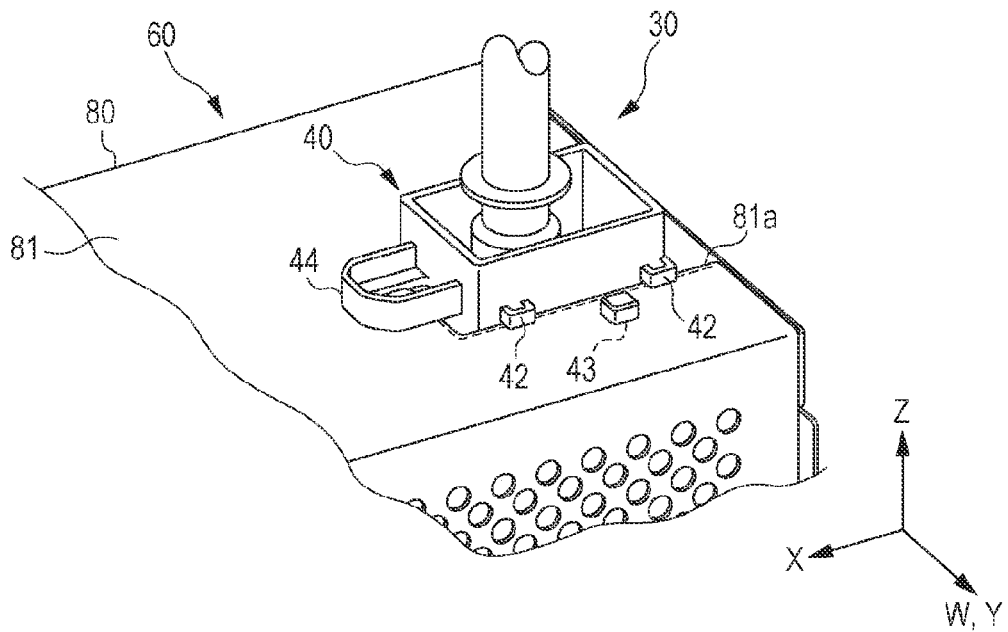
FIG. 5 is a perspective view that illustrates a state after the imaging unit and the electric box of the imaging device of the embodiment are combined with each other.

As illustrated in FIG. 4, the attaching member 40 is provided with a peripheral wall 41 which is formed in a square shape in a plan view. The first lens tube 31 is inserted into the peripheral wall 41. Two upside protrusions 42 and one lower side protrusion 43 are formed on each side surface of the peripheral wall 41 in the orthogonal direction W. The two upper side protrusions 42 are formed in the width direction X at intervals. The lower side protrusion 43 is formed between the two upper side protrusions 42 in the width direction X. In addition, an attachment protrusion 44 is formed on one outer surface of the peripheral wall 41 in the width direction X. A protrusion portion 44a (refer to FIG. 2) which protrudes downward is formed in the lower portion of the attachment protrusion 44.

When the second housing 80 is assembled into the first housing 70, the attaching member 40 is fitted into the top plate 81 of the second housing 80 as follows. That is, when the second housing 80 is assembled into the first housing 70, the attaching member 40 is moved in the vertical direction Z with respect to the first lens tube 31 and the second lens tube 32 in such a manner that a position of the notch portion 81a of the top plate 81 matches with a position of the attaching member 40 in the vertical direction Z. As illustrated in FIG. 5, a portion for the notch portion 81a of the top plate 81 is fitted between the upside protrusion 42 and the lower side protrusion 43 of the attaching member 40 in the vertical direction Z. With this, a position of the attaching member 40 with respect to the electric box 60 is determined. In addition, as illustrated in FIG. 2, the protrusion portion 44a of the attachment protrusion 44 is fitted into the fitting hole 81b of the top plate 81 after the attaching member 40 is fitted into the notch portion 81a of the top plate 81.

An action of the printing apparatus 11 in the embodiment will be described with reference to FIG. 6. Meanwhile, a white arrow denotes the flow of the air and a mashed arrow denotes the noise in FIG. 6.

When a board in which the circuit board 50 and the control board 61 are integrated with each other is attached to the second lens tube 32, there is a concern in that tension, caused by the gravity of the integrated board, of the second lens tube 32 moving downward to the first lens tube 31 is greater than the adhesive strength between the first lens tube 31 and the second lens tube 32. For this reason, there is a possibility that the second lens tube 32 will be detached from the first lens tube 31.

Here, the imaging device 20 of the embodiment is configured such that the circuit board 50 and the control board 61 are independently formed, and the circuit board 50 and the control board 61 are connected to each other via the cable 52. With this, the second lens tube 32 holds only the circuit board 50, and the tension of the second lens tube 32 moving downward to the first lens tube 31 becomes smaller than that of the board in which the circuit board 50 and the control board 61 are integrated with each other. For this reason, it is possible to prevent the second lens tube 32 from being detached from the first lens tube 31.

Figure 6:
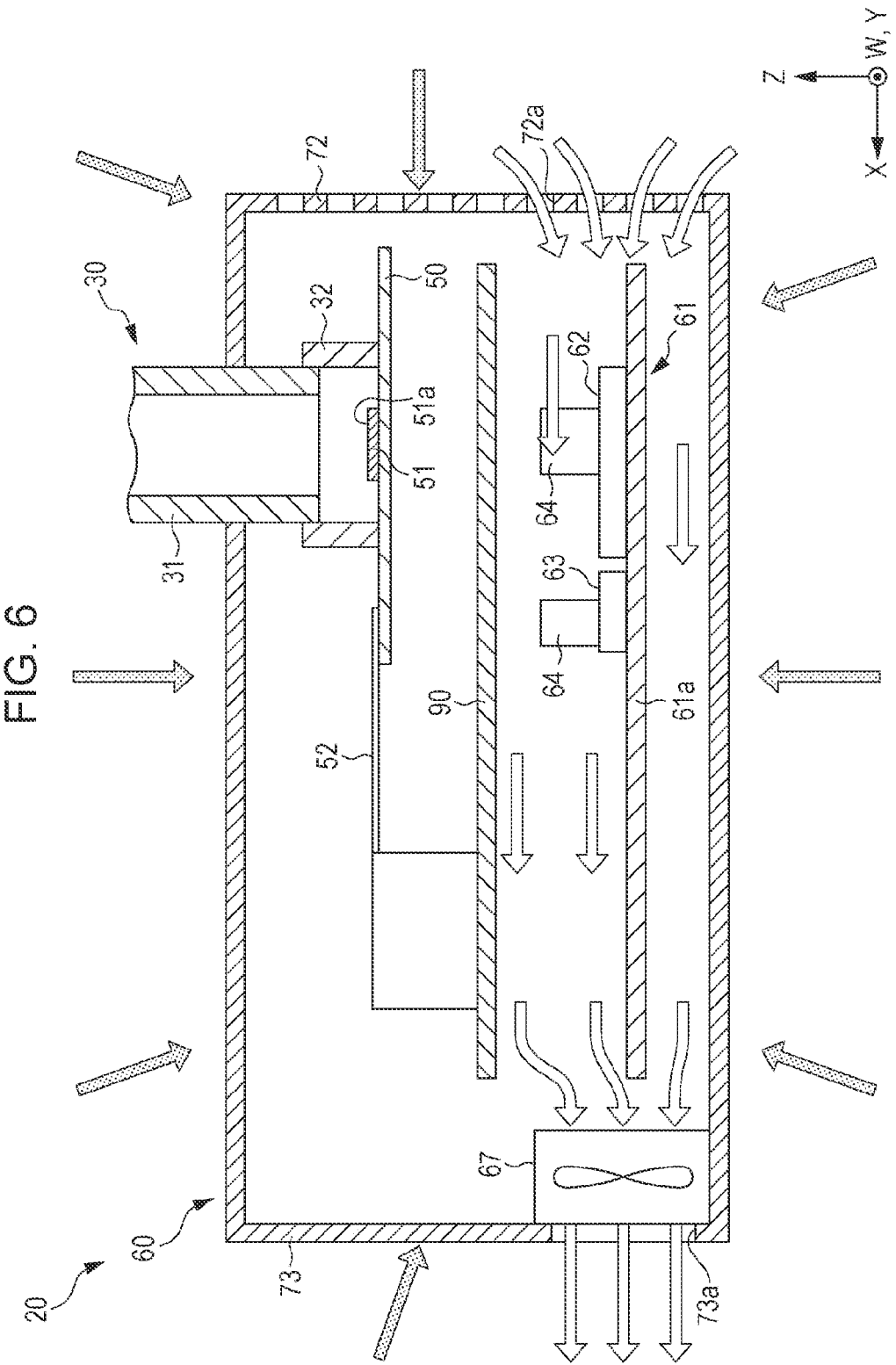
FIG. 6 is a schematic sectional view of the imaging device of the embodiment.

In addition, the imaging device 20 of the embodiment, as illustrated in FIG. 6, the circuit board 50 (the imaging element 51), the cable 52, and the control board 61 are accommodated in the electric box 60 which functions as the electromagnetic shield. With this, since the noise is prevented from entering the electric box 60 from the outside of the imaging device 20, it is possible to prevent the noise from entering the circuit board 50 (the imaging element 51), the cable 52, and the control board 61.

However, since the control board 61 is accommodated in the electric box 60, when the heat generated from the control board 61, particularly the heat generated from the image processing unit 62 and the transportation amount calculating unit 63 is transferred to the imaging unit 30, thermal expansion and thermal deformation of the first lens tube 31 and the second lens tube 32 may occur in some cases. With this, in a case where an image-formed position of the image side lens 37 (refer to FIG. 2) and a position of the imaging surface 51a of the imaging element 51 are shifted from each other, or the first lens tube 31 and the second lens tube 32 are inclined with respect to the vertical direction Z, the accuracy of imaging of the lower surface of the continuous forms paper P may be degraded.

Because of this, the imaging device 20 of the embodiment is provided with the thermal insulation member 90 which partitions the control board 61 and the imaging unit 30. For this reason, since the heat generated from the control board 61 is suppressed from being transferred to the imaging unit 30 side, and the temperature of the imaging unit 30 is less likely to be increased.

In addition, the air from the outside of the electric box 60 flows into the electric box 60 via the cooling fan 67 through a via hole 72a of the first side plate 72 of the electric box 60, passes through the space between the board body 61a of the control board 61 and the thermal insulation member 90, and then flows out from the opening portion 73a of the second side plate 73. At the same time, the image processing unit 62, the transportation amount calculating unit 63, and the electronic component 64 are cooled by the air passing through the space between the board body 61a and the thermal insulation member 90. For this reason, the heat generated from the control board 61 is less likely to be transferred to the imaging unit 30.

According to the printing apparatus 11 of the embodiment, it is possible to achieve the following effects.

(1) Since the imaging element 51, the cable 52, and the image processing unit 62 are accommodated in the electric box 60, the noise of the electric box 60 is prevented from entering the imaging element 51, the cable 52, and the image processing unit 62. Accordingly, since the noise is prevented from entering the image of the lower surface of the continuous forms paper P which is captured by the imaging unit 30, it is possible to suppress degradation of calculation accuracy of the transportation amount of the continuous forms paper P by the imaging control unit 21.

(2) Since the control board 61 and the imaging unit 30 are partitioned by the thermal insulation member 90, the heat generated from the control board 61 is less likely to be transferred to the imaging unit 30. For this reason, it is possible to suppress an increase in the temperature of the imaging unit 30. With this, the thermal expansion and thermal deformation of the first lens tube 31 and the second lens tube 32 of the imaging unit 30 are suppressed, and thus it is possible to suppress the degradation of the accuracy of imaging of the lower surface of the continuous forms paper P due to the imaging unit 30.

(3) Since the cooling fan 67 cools the control board 61, the image processing unit 62 which is mounted on the control board 61, the transportation amount calculating unit 63, and the electronic component 64, the heat generated from the control board 61 is less likely to be transferred to the imaging unit 30. For this reason, it is possible to suppress the increase in the temperature of the imaging unit 30.

(4) The thermal insulation member 90 is formed of the steel sheet. For this reason, the noise which is generated from the image processing unit 62, the transportation amount calculating unit 63, and the electronic component 64 on the control board 61 is prevented from entering the imaging unit 30 by the thermal insulation member 90. For this reason, the noise which is generated from the image processing unit 62, the transportation amount calculating unit 63, and the electronic component 64 is prevented from entering the cable 52 and the imaging element 51.

(5) The cooling fan 67 is disposed farther on the lower side than the thermal insulation member 90. For this reason, it is easy to form the flow of the air between the thermal insulation member 90 and the control board 61, and thus the heat generated from the control board 61 is less likely to be transferred to the thermal insulation member 90. For this reason, the temperature of the thermal insulation member 90 is not easily increased, and thus a suppressing effect on the increase in the temperature of the imaging unit 30 is improved.

(6) The attaching member 40 can move in the vertical direction Z with respect to the first lens tube 31 and the second lens tube 32. For this reason, when the attaching member 40 is fitted into the top plate 81 of the second housing 80, the force acting on the attaching member 40 is suppressed from acting on the first lens tube 31 and the second lens tube 32. Therefore, since the first lens tube 31 and the second lens tube 32 are prevented from being inclined with respect to the vertical direction Z, the accuracy of imaging of the lower surface of the continuous forms paper P is prevented from being degraded by the imaging unit 30.

The embodiment may be modified to become another embodiment as follows.

In the above-described embodiment, the first housing 70 and the second housing 80 may be formed of other metallic materials such as copper, aluminum, or an aluminum alloy instead of the steel sheet. In short, the material of the first housing 70 and the second housing 80 is not limited to the steel sheet as long as it functions as the electromagnetic shield.

In the above-described embodiment, the thermal insulation member 90 may be formed of a resin material, aluminum, or the aluminum alloy instead of the steel sheet. In short, the material of the thermal insulation member 90 is not limited.

In the above-described embodiment, the cooling fan 67 may be attached to the first side plate 72 of the first housing 70. In this case, the first side plate 72 is formed into the same shape as that of the second side plate 73 in the above-described embodiment, and the second side plate 73 is formed into the same shape as that of the first side plate 72 in the above-described embodiment. In addition, the cooling fan 67 intakes the air from the outside of the electric box 60 via the opening portion (corresponding to the opening portion 73a of the second side plate 73 in the above embodiment) of the first side plate 72, and discharges the air to the space between the control board 61 and the thermal insulation member 90. Further, the air discharged from the cooling fan 67 flows to the outside of the electric box 60 via the plurality of via holes of the second side plate 73 (corresponding to the via hole 72a of the first side plate 72 in the above embodiment).

In the above-described embodiment, the cooling fan 67 may be disposed on the outside of the electric box 60. In short, if the control board 61, the image processing unit 62, the transportation amount calculating unit 63, and the electronic component 64 which are disposed in the electric box 60 can be cooled, the disposition of the cooling fan 67 is not limited to that of the cooling fan 67 in the above-described embodiment.

In the above-described embodiment, at least one of the cooling fan 67 and the thermal insulation member 90 may be omitted. If the cooling fan 67 is omitted, the opening portion 73a of the second side plate 73 in the first housing 70 will be omitted. Further, if the cooling fan 67 is omitted, the plurality of via holes 72a of the first side plate 72 may be omitted.

In the above-described embodiment, the printing control unit 19 and the imaging control unit 21 may be integrated.

In the above-described embodiment, the printing apparatus 11 may be applied to a line type printer.

In the above-described embodiment, at least one of the winding unit 14 and the tension roller 16 may be omitted from the printing apparatus 11. In this case, the transporting unit is not provided with at least one of the winding unit 14 and the tension roller 16.

In the above-described embodiment, the medium transporting apparatus may be configured such that the printing unit 18 is omitted from the printing apparatus 11.

The medium is not limited to the continuous forms paper P, and may be cutform paper, a resin film, metallic foil, a metallic film, a composite film (a laminated film) of the resin and metal, fabrics, non-woven fabrics, ceramic sheets, or the like.

The liquid discharged as a small droplet from the printing unit 18 is formed into a granular, tear, or thread shape which has a tail. In addition, the liquid mentioned here may be any material which can be ejected from the printing unit 18. For example, the substance is preferable to be in a liquid state, and be a liquid body having high viscosity or low viscosity, for example sol, gel water, and other fluid bodies such as an inorganic solvent, an organic solvent, a solution, or a liquid resin. Further, in addition to the liquid as a state of the substance, a substance obtained by melting, dispersing, and mixing the particles, which are formed of a solid body such as a pigment, in a solvent may be employed. In a case where the liquid is ink, the ink is assumed to include a typical water based ink and a solvent ink, and a variety of liquid compositions such as a gel ink, a hot melt ink, or the like.

The entire disclosure of Japanese Patent Application No. 2014-149057, filed Jul. 22, 2014 is expressly incorporated by reference herein.

What is claimed is:

1. An imaging device comprising:
    an imaging unit that includes an imaging element for imaging a medium;
    an image processing unit that image-processes an image of the medium captured by the imaging unit;
    an electrical transmission line that electrically connects the imaging unit and the image processing unit with each other; and
    an electromagnetic shield that covers the imaging element, the image processing unit, and the electrical transmission line;
    wherein in the electromagnetic shield, the imaging unit and the image processing unit are disposed to be separated from each other, and a thermal insulation member which partitions the imaging element and the image processing unit is disposed between the imaging unit and the image processing unit.

2. The imaging device according to claim 1, further comprising:
    a cooling fan that cools an image processing unit.

3. A medium transporting apparatus comprising:
    a transporting unit that transports a medium; and
    an imaging device that images the medium transported by the transporting unit,
    wherein the imaging device includes
        an imaging unit that includes an imaging element for imaging a medium,
        an image processing unit that image-processes an image of the medium captured by the imaging unit,
        an electrical transmission line that electrically connects the imaging unit and the image processing unit with each other, and
        an electromagnetic shield that covers the imaging element, the image processing unit, and the electrical transmission line;
        wherein in the electromagnetic shield, the imaging unit and the image processing unit are disposed to be separated from each other, and a thermal insulation member which partitions the imaging element and the image processing unit is disposed between the imaging unit and the image processing unit.

4. A printing apparatus comprising:
    a transporting unit that transports a medium;
    a printing unit that performs printing on the medium transported by the transporting unit; and
    an imaging device that images the medium transported by the transporting unit,
    wherein the imaging device includes
        an imaging unit that includes an imaging element for imaging a medium,
        an image processing unit that image-processes an image of the medium captured by the imaging unit,
        an electrical transmission line that electrically connects the imaging unit and the image processing unit with each other, and
        an electromagnetic shield that covers the imaging element, the image processing unit, and the electrical transmission line;
        wherein in the electromagnetic shield, the imaging unit and the image processing unit are disposed to be separated from each other, and a thermal insulation member which partitions the imaging element and the image processing unit is disposed between the imaging unit and the image processing unit.

\* \* \* \* \*